Feb. 9, 1932.  E. KÄSTEL  1,844,660
ROTARY CUTTER
Filed June 11, 1931
Fig. 1
Fig. 3
Fig. 4
Fig. 2
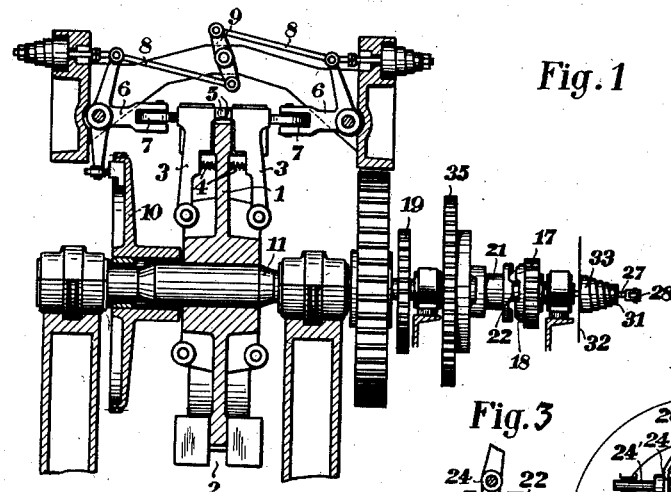
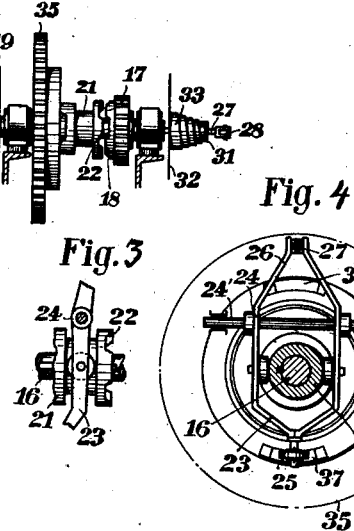
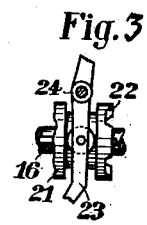
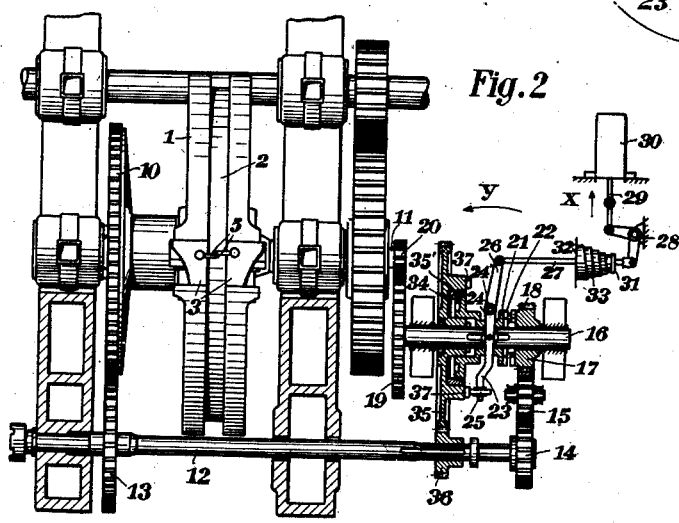
Inventor
EMIL KÄSTEL
By Karl Viertel
Attorney Patented Feb. 9, 1932

1,844,660

UNITED STATES PATENT OFFICE

EMIL KÄSTEL, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY

ROTARY CUTTER

Application filed June 11, 1931, Serial No. 543,631, and in Germany June 11, 1930.

My invention relates to rotary cutters for cutting long metallic articles such as rods, wire, bars, etc., issuing from a rolling mill into pieces of equal length; and more particularly to improvements in rotary cutters for the purpose set forth, in which the work to be cut is carried upon a rotary mandrel or drum, having one or more guiding grooves and being provided with cutting blades, which extend transversely to the circumferential face of the drum and are cooperatively associated with a blade actuating device such as a rotary disc, cam, or the like, the latter being rotated a lower angular speed than that of the drum around the axis of the latter.

The rotary movements of the cutter drum and of the blade actuating member are so related to each other that the cutting occurs when both the cutting blades and the stops, actuating the latter, are in aligned position viz. at the top of the drum. While the cutter drum rotates continuously, the blade controlling disc only rotates when a bar passes over the drum, said bar in running over the cutting drum closing an electric circuit and thus causing an electromagnet to throw a coupling clutch into engagement with a driving mechanism, so that a blade control disc will rotate and cause the cutting blades of the drum to cut at definite intervals of time, whereby the bar is cut into pieces of equal length.

As a matter of fact, known to practitioners in this field, with rotary cutters of the type concerned a considerable delay and loss of time is caused by the extreme end piece of each bar to be cut, which as a rule is shorter than the foregoing normal lengths or standard pieces.

As soon as the cutting of the bar is finished and the bar has left the drum the electric circuit referred to above is broken and the electromagnet will cease to act; however the coupling clutch inserted into the drive of the control disc has become automatically disengaged hitherto not until the blade controlling disc has reached its initial or zero position; in other words a fresh bar can be fed into the rotary cutting machine only after the blade controlling disc, rotating at a relatively low speed has completed its movement, which means that the cutter drum must run idle up to this moment and that the cutting work is interrupted for a substantial period of time and that the output of the cutting machine is considerably reduced.

The principal object of this invention is to provide an improved rotary cutting machine of the type concerned in which the said draw-back is eliminated.

In order that the nature and scope of the invention may be clearly understood the same is fully described hereinafter with reference to the accompanying drawings illustrating by way of an example an embodiment of the invention.

Figure 1 is a fragmentary cross section, taken vertically through the cutting machine, Figure 2 is a plan view partly in section, Figure 3 is a side elevation of a double acting coupling member designed according to this invention, Figure 4 is a sectional front elevation of said coupling member and its actuating levers.

According to this invention in addition to the usual primary driving mechanism rotating the blade controlling disc at a relatively low ratio of speed during its normal working periods another (secondary) driving mechanism is provided for returning the blade controlling disc into its zero position, which is automatically thrown into operation at the end of each set of cutting operations and the ratio of speed of which is substantially higher than that of the primary driving mechanism.

The cutter drum 1 is formed with a groove 2 in which the rolled goods to be cut are guided. Blade holders 3 are pivotally mounted on the drum 1, which are under the action of springs 4. These springs tend to force the blade holders 3 so far apart that the cutter blades 5 do not extend into the guide groove 2. Only when the rods 8, interconnecting the rocking levers 6 move into the position shown in Figure 1, the blades 5 are caused to cut.

The rocking of the levers 6 which are coupled together by rods 8 and levers 9 is effected in a known manner by a control disc 10, which is free to rotate on the shaft 11 carrying the cutter drum 1. The control disc 10 is provided at its circumference with teeth in mesh with a toothed wheel 13 mounted on the shaft 12 (see Figure 2). The shaft 12 also carries at its other end a toothed wheel 14, engaging a toothed wheel 15, which is in turn engaged by a toothed wheel 17 loosely fitting on the shaft 16. The side of this toothed wheel 17 turned towards the cutter drum 1 is provided with claws 18. The shaft 16 furthermore carries a toothed wheel 19 in mesh with a toothed wheel 20 fitting on the shaft 11 carrying the cutter drum 1, and drives the shaft 16. On the shaft 16 is axially displaceable a clutch or coupling piece 21. This clutch 21 is provided on the side turned towards the toothed wheel 17 with claws 22 which, on the corresponding axial displacement of the clutch 21, engage between the claws 18 of the toothed wheel 17. The clutch 21 engages one limb 23 of a double lever 24 rocking about the axis 24', and which at its free end has a bowl or runner roller 25. The free end of the other limb 26 of the double lever 24 is connected by means of the rod 27, angle lever 28 and rod 29, with the electromagnet 30. The rod 27 carries a plate 31. Between this plate 31 and a suitable support 32 is arranged a spring 33. On the running of a rolled bar on to the cutter drum 1, the magnet 30 is energized in known manner, the rod 29 is moved in the direction of the arrow $x$, and by means of the angle lever 28 and the rod 27, the double lever 24, with the simultaneous compression of the spring 33, is so far rocked in the direction of the arrow $y$, and the clutch 21 is so far displaced towards the toothed wheel 17 that the claws 22 engage between the claws 18 of the toothed wheel 17 and thus the wheel 17 is coupled with the rotating clutch 21 and the control disc 10 is set in rotation. As soon as the last piece of the rolled bar, which as a rule is shorter than the cutting length, has left the cutter drum, the magnet 30 loses current, and under the action of the expanding spring 33, the double lever 24 is rocked in the opposite direction to that of the arrow $y$. The clutch 21 is thereby so far displaced on the shaft 16 that its connection with the toothed wheel 17 is released and this wheel stops, which also results in a stoppage of the control disc 10. At the same time, however, the friction cone 34 arranged on the clutch 21 is pressed against the correspondingly shaped friction ring 35' arranged on the toothed wheel 35 running loose on the shaft 16, and so engages the clutch 21 with the toothed wheel 35 that the latter now takes part in the rotation of the clutch. The toothed wheel 35 drives the toothed wheel 36 on the shaft 12 and the control disc 10 is now rotated in the opposite direction to that of its previous rotation, back into the initial position, that is, into the position, which the disc 10 takes up when a rolled bar runs on to the cutter drum. Shortly before the disc 10 reaches this position, one of the two cams 37 arranged on the toothed wheel 35 runs against the roller 25 arranged on the free end of the limb 23. This roller is pressed down by the toothed wheel 35. This has as result a rocking of the double lever in the direction of the arrow $y$, and a displacement of the clutch 21, so that the contact between the friction cone 34 and friction ring 35' is released, and the toothed wheel 35 and consequently the control disc 10 also come to rest. The control disc 10 has then exactly reached its initial position. A fresh rolled rod can now be run on to the cutter drum and the control drum is again set in rotation in the manner described. The transmission ratio between the control disc 10 and the toothed wheel 13 driving it and between the toothed wheels 35, 36, is so chosen that, on the one hand, a rapid backward rotation of the control disc takes place, and on the other hand it is ensured that one of the cams 37 of the wheel 35 will disengage the friction cone when the control disc 10 is in the initial position. Various changes and modifications may be made in the design of rotary cutting machines having the improvements described above without substantially deviating from the spirit and the salient ideas of this invention. The invention may also be used in connection with cutter drums having a plurality of grooves for guiding the rolled articles to be cut. In this case, a separate control mechanism must be provided for each of the running paths of the cutting drum, that is for each of the control discs.

What I claim is:

1. In a rotary cutter of the type set forth the combination with a rotary drum having a guiding groove circumferentially arranged thereon, of cutting blades mounted on said drum and extending transversely to its circumferential face, a rotary disc cooperatively associated with and controlling the work of said cutting blades, a primary driving mechanism for rotating said control disc during its working period, a secondary driving mechanism for returning the control disc into its zero position during its idle period, and automatic means for alternately throwing the respective driving mechanisms into and out of operation.

2. A rotary cutter of the type set forth and having the features outlined in claim 1, in which the automatic means for alternately throwing the respective driving mechanisms into and out of operation comprise a slidably mounted coupling member having two working faces, the latter being cooperatively associated with the main gear wheels of the driving mechanisms, and electromagnetically controlled means for actuating the said coupling member.

3. A rotary cutter of the type set forth and having the features outlined in claim 1, in which the ratio of transmission of the said secondary driving mechanism is greater than that of the primary driving mechanism, so that the blade controlling disc is returned into its zero position at a rotary speed greater than its normal working speed.

4. A rotary cutter of the type set forth and having the features outlined in claim 1, in which the automatic means for alternately throwing the respective driving mechanisms into and out of operation comprise a slidably mounted coupling member having two working faces, the latter being cooperatively associated with the main gear wheels of the driving mechanisms, and electromagnetically controlled means for actuating the said coupling member, the said electromagnetically controlled means comprising a double armed lever, cooperatively associated with an electromagnet, a spring actuated member counteracting to the said electromagnet, and a cam actuated gear, adapted to throw the coupling member out of engagement, when the control disc reaches its zero position.

5. A rotary cutter of the type set forth and having the features outlined in claim 1, in which the automatic means for alternately throwing the respective driving mechanisms into and out of operation comprise a slidably mounted coupling member having two working faces, the latter being cooperatively associated with the main gear wheels of the driving mechanisms, and electromagnetically controlled means for actuating the said coupling member, one of working faces of the coupling member being provided with a set of claws adapted to engage corresponding claws of the primary driving mechanism, the other working face of the coupling member being formed with a cone adapted to engage the secondary driving mechanism by frictional contact.

In testimony whereof I have signed my name to this specification.

EMIL KÄSTEL.